United States Patent [19]

Algrain et al.

[11] Patent Number: 5,031,481
[45] Date of Patent: Jul. 16, 1991

[54] ELECTRO-HYDRAULIC CONTROL SYSTEM FOR A DUAL-PASS CONTINUOUSLY VARIABLE TRANSMISSION

[75] Inventors: Marcelo C. Algrain, Barrington; Scott R. Anderson, LaGrange; Richard L. Smirl, Arlington Heights, all of Ill.

[73] Assignee: Borg-Warner Automotive, Inc., Sterling Heights, Mich.

[21] Appl. No.: 447,806

[22] Filed: Dec. 8, 1989

[51] Int. Cl.$^5$ .................. F16H 55/56; F16H 63/08
[52] U.S. Cl. ........................... 74/868; 74/866; 474/8; 474/28
[58] Field of Search ............ 474/8, 28; 74/868, 869

[56] References Cited

U.S. PATENT DOCUMENTS

| Re. 31,361 | 8/1983 | Smirl . | |
|---|---|---|---|
| 4,433,594 | 2/1984 | Smirl . | |
| 4,436,193 | 3/1984 | Smirl . | |
| 4,442,727 | 4/1984 | Young | 74/868 X |
| 4,458,318 | 7/1984 | Smirl et al. . | |
| 4,462,275 | 7/1984 | Mohl et al. . | |
| 4,542,665 | 9/1985 | Yamamuro et al. . | |
| 4,566,354 | 1/1986 | Kumura et al. . | |
| 4,583,627 | 4/1986 | Kumura et al. . | |
| 4,630,504 | 12/1986 | Smirl | 474/28 X |
| 4,631,043 | 12/1986 | Tokoro et al. . | |
| 4,648,496 | 3/1987 | Petzold et al. . | |
| 4,653,621 | 3/1987 | Oshiage . | |
| 4,663,714 | 5/1987 | Cornell et al. . | |
| 4,665,773 | 5/1987 | Hiramatsu et al. . | |
| 4,729,264 | 5/1988 | Sakai . | |
| 4,752,278 | 6/1988 | Falzoni | 74/868 X |
| 4,772,249 | 9/1988 | Kouno et al. | 474/28 |
| 4,778,435 | 10/1988 | Sigaya et al. | 474/28 |
| 4,798,561 | 1/1989 | Hattori et al. | 74/868 X |
| 4,811,225 | 3/1989 | Petzold et al. . | |
| 4,875,893 | 10/1989 | Giacosa | 474/28 |

FOREIGN PATENT DOCUMENTS

| 0139277 | 5/1985 | European Pat. Off. . |
|---|---|---|
| 0196807 | 10/1985 | European Pat. Off. . |
| 879350 | 6/1953 | Fed. Rep. of Germany . |

Primary Examiner—Allan D. Herrmann
Assistant Examiner—Khoi Q. Ta
Attorney, Agent, or Firm—Neuman, Williams, et al.

[57] ABSTRACT

A control system for controlling hydraulic pressure in a dual pass continuously variable transmission includes a pump to provide primary and secondary hydraulic pressures for regulating the pulley ratio and belt tension. A minicomputer regulates the primary and secondary pressures, and a transition mechanism alternates the paths of the primary and secondary pressures between first and second pulleys of the transmission so that the primary pressure is fed to the drive pulley and the secondary pressure is fed to the driven pulley.

21 Claims, 4 Drawing Sheets

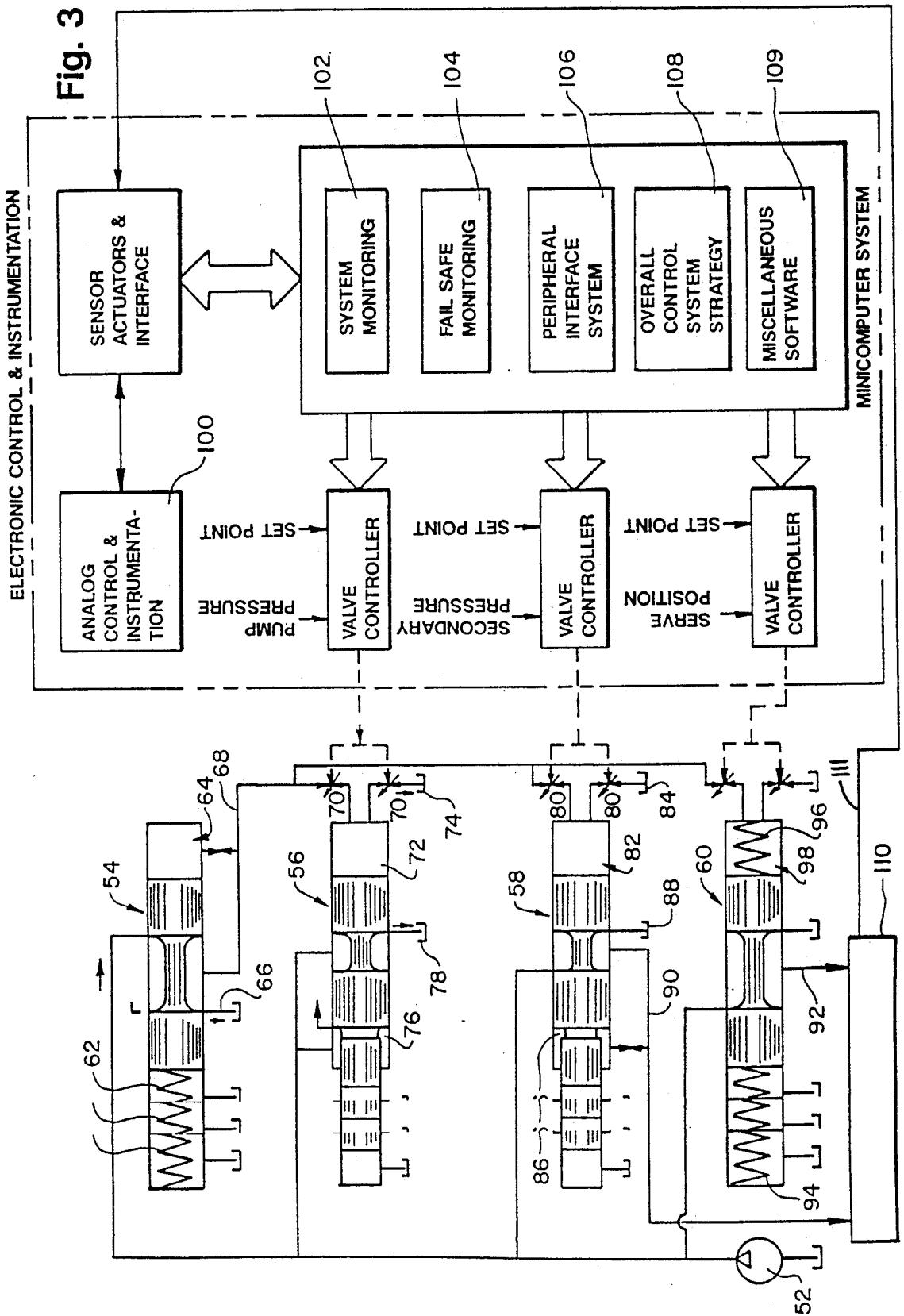

ELECTRO-HYDRAULIC CONTROL SYSTEM FOR A DUAL-PASS CONTINUOUSLY VARIABLE TRANSMISSION

BACKGROUND OF THE INVENTION

1. Field of the Invention

The invention relates to dual-pass continuously variable transmission systems, that is, systems having two drive paths. In the system, the transmission ratio and belt tension are controlled by a hydraulic circuit that provides a primary, or ratio determining, pressure to regulate the drive pulley and a secondary, or belt tensioning, pressure to regulate the driven pulley. More particularly, the invention relates to a control system for regulating the primary, secondary, and line pressures of the hydraulic control circuit, including means for alternating the supplies of primary and secondary pressures between the first and second pulleys of the transmission system in response to change in the drive path so that the drive pulley always receives the primary, ratio determining, pressure and the driven pulley always receives the secondary, belt tensioning, pressure.

2. Description of the Prior Art

Continuously variable transmissions (CVTs) are known in the art. The typical CVT employs an infinitely variable speed mechanism comprised of a pair of adjustable pulleys, each pulley having at least one sheave that is axially fixed and another sheave that is axially movable relative to the first. A flexible belt of metal or elastomeric material intercouples the pulleys. The inner faces of the sheaves of the pulley are bevelled or chamfered so that as the axially displaceable sheave moves relative to the fixed sheave, the distance between the sheaves and, thus the effective pulley diameter may be adjusted.

The displaceable sheave includes a fluid constraining chamber for receiving fluid to move the sheave and thus change the effective pulley diameter. As fluid is added to or exhausted from the chamber, the effective pulley diameter changes. Generally the effective diameter of one pulley is moved in one direction as the effective diameter of the other pulley is moved in the opposite direction. This enables adjustment of the ration between the effective diameters of the pulleys.

A dual-pass continuously variable transmission (CVT) is a CVT which provides two alternate power paths between the input and output shafts. One of the paths utilizes the first of the adjustable pulley of the infinitely variable speed mechanism as the driving pulley and the second path utilizes the second of the infinitely variable pulleys as the driving pulley. The first and second variable pulleys are disposed on first and second intermediate shafts, respectively. When the first drive path is utilized, the second variable pulley and second intermediate shaft are driven by the first pulley of the infinitely variable speed mechanism. When the second drive path is utilized, the first pulley and first intermediate shaft are driven by the second pulley of the infinitely variable speed mechanism.

The input shaft is connected to the first intermediate shaft by a reduction gear and a one-way clutch that is engaged when the first drive path is utilized. The input shaft is connected to the second intermediate shaft by an overdrive gear and an engagable jaw clutch. The jaw clutch is released when the first drive path is utilized to allow the overdrive gear to rotate independently of the second intermediate shaft, which may be rotating at a slower rate. The output shaft is connected to the second intermediate shaft by an overdrive gear and one-way clutch that is engaged when the first drive path is utilized. The output shaft is connected to the first intermediate shaft through a reduction gear and an engagable jaw clutch. The jaw clutch is released when the first path is utilized and engaged when the second drive path is utilized.

To increase the output speed, the CVT initially establishes the first drive path with both one-way clutches engaged to effect a first pass through the CVT. The infinitely variable speed mechanism then changes continually from underdrive to overdrive thereby increasing the rotational speed of the second intermediate shaft and the output shaft. The second intermediate shaft will eventually be rotating at the same speed as the overdrive gear intermeshed with the teeth of a gear rotating with the input shaft. When this occurs, both jaw clutches can be engaged and the second drive path is established for a second pass through the CVT. The two one-way clutches overrun to allow the second pulley to drive the first pulley. The output shaft thus undergoes a second increase in output speed during the second pass as the ratio between the second pulley and the first pulley is increased from underdrive to overdrive. Such a system is disclosed in U.S. patent application No. 564,856 filed Dec. 23, 1983, now abandoned, which is incorporated herein by reference.

To increase the ratio across the variable component in the drive path that is currently established, the movable sheave of the driving pulley must be moved inward and the belt on the driving pulley forced outward. This requires an appropriate hydraulic pressure to be supplied to the constraining chamber of the driving pulley. In order to assure that a smooth transfer is achieved when the drive path alters on transition from the first pass to the second pass, or vice versa, it is important that the hydraulic pressure does not change prematurely as this is likely to cause the ratio across the variable component to change away from the ratio at which engagement of the jaw clutches is possible. This will create a mismatch between the speed of rotation of the two halves of the engaging clutch which will cause excessive wear to the clutches, particularly if they are jaw clutches.

Jaw clutches are generally utilized in preference to friction clutches to change the drive path of a dual-pass CVT as the torques involved in the engagement of a clutch between a gear and one of the intermediate shafts may be as high as 300–400 ft. lbs. A large area and high pressure would therefore be required for a friction clutch to engage at such torques. Also the time involved in engaging a friction clutch at such torques would be far greater than that for a jaw clutch which will engage within hundredths of a second and may only be 3.5 inches in diameter.

The use of a pair of jaw clutches, however, presents additional problems. Jaw clutches cannot engage when there is a significant difference in speed between the two clutch halves or excessive clutch wear will result. In addition, as each jaw clutch has a finite number of teeth, the two jaw clutches do not necessarily engage simultaneously. Therefore, there is likely to be some delay between the engagement of the two clutches. This delay is dependent upon the number of teeth in each clutch and the small speed difference across the clutch members. The delay may be on the order of hundredths of a second.

It is therefore important that the hydraulic pressures determining the ratio across the variable component and the belt tension do not change until both jaw clutches are engaged or the clutch halves may move away from synchronicity and the smooth transfer from one pass to another will be disrupted. In a hydraulically controlled dual-pass CVT it is therefore important to have a system that provides the desired primary and secondary hydraulic pressures to the driver and driven pulleys, respectively, for given input conditions in each of the two passes.

OBJECTS OF THE INVENTION

Accordingly it is an object of this invention to provide an improved control system for a dual-pass CVT that provides means by which the required pressure is applied to the driver and the driven pulleys to give the desired ratio and belt tension, respectively, for each of the passes through the variable component.

It is a specific object of this invention to provide means by which the primary and secondary pressures of the hydraulic circuit are delivered to the first and second pulleys of the infinitely variable mechanism in accordance with the drive path established, so that the driver pulley is continuously regulated by the primary pressure and the driven pulley is continuously regulated by the secondary pressure.

It is another object of the invention to provide desired primary and secondary pressures in response to engine or input conditions and operating parameters.

Other objects, advantages and features of this invention will become apparent on reading the following description and appended claims, and upon reference to the accompanying drawings.

SUMMARY OF THE INVENTION

The control system of this invention utilizes a switching mechanism to alter the course of the primary and secondary hydraulic pressures between supplying first and second variable pulleys respectively and supplying second and first variable pulleys respectively. The primary and secondary hydraulic pressures are each maintained on one of a pair of lines, the final destination of each line being determined by the path taken through a transition mechanism. The path is altered in response to a change in drive path of the CVT.

This type of arrangement is considered preferable to that in which one line always feeds the same pulley and the pressure on each line is altered to provide a primary or secondary pressure as desired depending upon whether the pulley supplied is a driver or a driven pulley as a result of the drive path currently being utilized. This is because the fixed feed arrangement involves relatively large changes in pressure on the lines and the magnitude of these pressure changes has been found to be detrimental to a smooth transfer between drive paths.

In accordance with one embodiment of the invention, a control system for controlling the hydraulic pressure in a dual-pass continuously variable transmission which achieves the foregoing objectives has a continuously variable component including first and second hydraulically actuated variable pulleys disposed respectively on first and second intermediate shafts and first and second clutches engagable to effect transition from a first drive path, utilized during a first pass in which the first pulley is a drive pulley, to a second drive path utilized during a second pass in which the second pulley is the drive pulley. The clutches are releasable to return the system from the second drive path to the first drive path.

The control system includes means for providing a primary hydraulic pressure to one of the first and second pulleys and a means for providing a secondary pressure to the other of the first and second pulleys. Means for electronically regulating the primary and secondary hydraulic pressures is responsive to engine or input conditions and a transition mechanism enables the primary and secondary hydraulic pressures to be switched between the first and second variable pulleys in response to a change in drive path.

The output of a pump may be regulated by a valve to provide hydraulic line pressure. This line pressure is then supplied to a pilot valve to provide pilot pressure to the solenoid operated valves. This pilot valve may be either a servo valve or a solenoid valve. In the preferred arrangement, a solenoid valve is operated in a pulse-width modulated manner. To obtain higher pressures the valve has a longer duration of time open to the pilot supply pressure, thus increasing the pilot pressure. To decrease pressure, the valve is open for a greater duration to sump, thus reducing pilot pressure. The line pressure is also supplied to two other valves to provide primary and secondary pressures to the driver and driven pulleys, respectively. To regulate line pressure a combination of a spool valve and a solenoid valve is used to maintain the actual line pressure as close as possible to a set point generated by a minicomputer based on inputs from engine sensors. Any discrepancy between the set point and the actual line pressure will be corrected by the actuation of the solenoid valve which will cause the spool valve to adjust the line pressure towards its desired value. The primary and secondary line pressures are likewise controlled using spool valves and minicomputer driven solenoid valves.

The transition mechanism may be utilized to alter the course of the primary and secondary hydraulic pressure lines on engagement of the last of the clutches that changes the CVT from a first to a second pass. The lines are also returned to their original courses through the transition mechanism, when the last of the two clutches is released.

The transition mechanism may include a link between the first and second clutches that is pivotable about first, second and third points, with the third point being located intermediate the first and second points. The first point of the link is movable between first and second fixed positions in response to engagement and release of the first clutch. A valve is pivotally attached to the link at the third point and is movable between first and second positions, in response to displacement of the third point on rotation of the link about one of the first and second points. Means for rotating the link effects movement of the valve from the first to the second position by rotating the link about one of the first and second points. This occurs in response to the engagement or release of the last of the clutches.

The link connected between the first and second clutches may include a lever member that is rotatable about the first, second and third points and in which the second point is movable between first and second positions related to the first and second positions of the first point. The means for rotating the link about one of the first and second points may comprise first and second abutments. The first abutment prevents movement of the second point in a first direction beyond its first position and the second abutment prevents movement of the second point in a second direction, opposite the first direction, beyond its second position.

The valve is pivotally attached to the lever member at the third point and is movable between first and second positions, in response to displacement of the third point as a result of rotation of the link about either the first or second points. The first abutment member is movable between the first position of the second point and a third position, in response to engagement of the second clutch and is operable to move the second point from its first position to a position intermediate the first and second positions. The second abutment member is movable between the second position of the second point and a fourth position in response to release of the second clutch and is operable to move the second point from its second position to a position intermediate the first and second positions.

To facilitate movement of the second point between its first and second positions a protrusion may extend from the second point in a direction substantially transverse to its direction of motion. The first and second abutment members then comprise a ring or slot surrounding the protrusion movable between two positions, a first in which a first inner face of the ring or slot is in the first position and a second opposing inner face is in the third position, and a second in which the first inner face is in the fourth position and the second face is in the second position. The ring may be attached to the second clutch by a first link attached to the ring and a lever pivotally attached to the link at one end and to the second clutch at the other. The lever may pivot about a center point on engagement and release of the second clutch.

The movement of the transition valve from its first position to its second position can also be used to trigger a sensor that operates to change the parameters for regulating the hydraulic pressure supplied to the primary and secondary pulleys so that different regimes may be employed for the first and second passes.

BRIEF DESCRIPTION OF THE DRAWINGS

For a more complete understanding of this invention, reference should now be made to the embodiment illustrated in greater detail in the accompanying drawings and described by way of example only. In the drawings:

FIG. 3 is a schematic view of the control system of this invention for controlling the supply of hydraulic pressure to the primary and secondary pulleys of the dual-pass CVT.

DETAILED DESCRIPTION OF THE DRAWINGS

Figure 1:
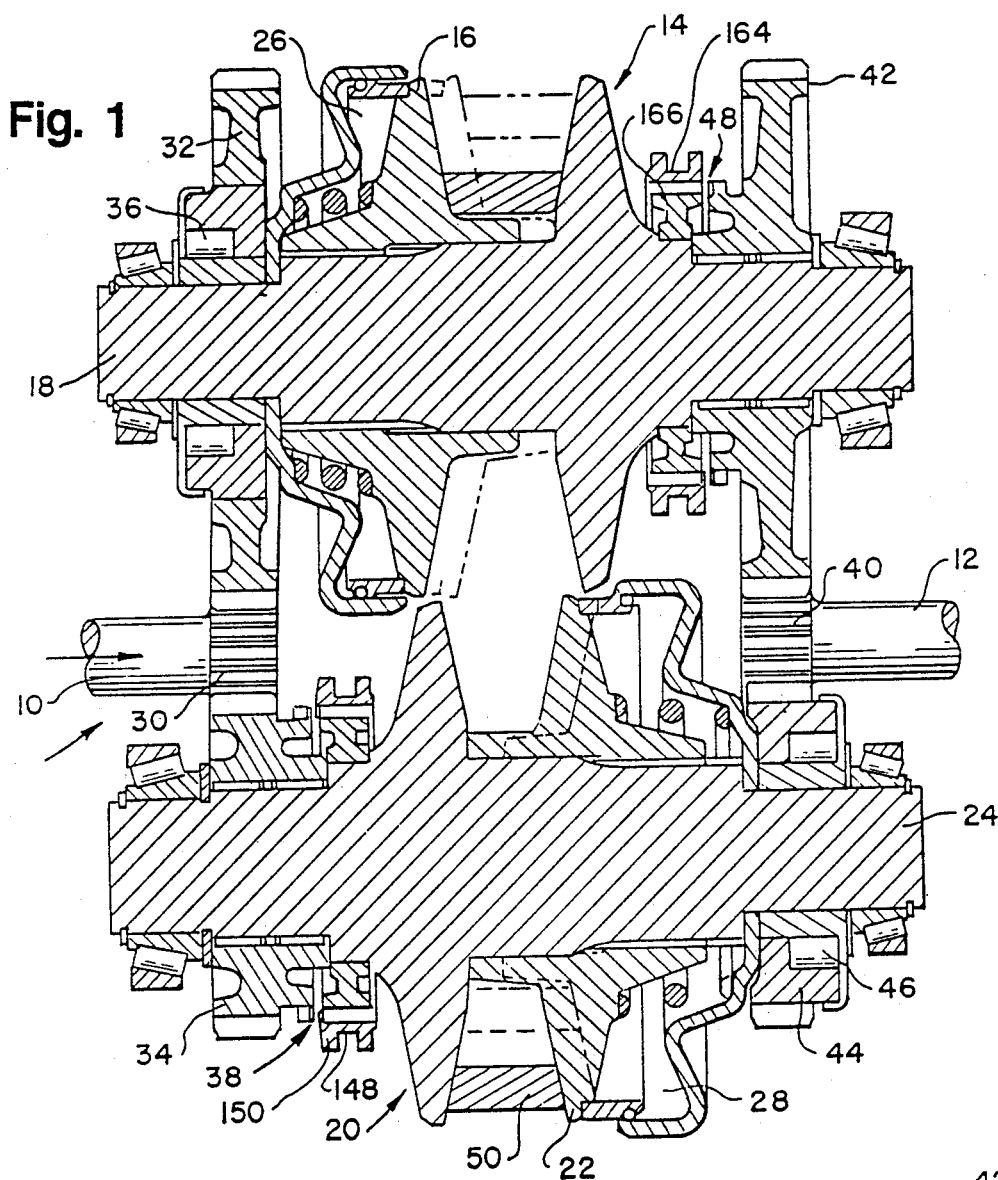
FIG. 1 is a section through a dual-pass CVT.
Figures 2A, 2B:
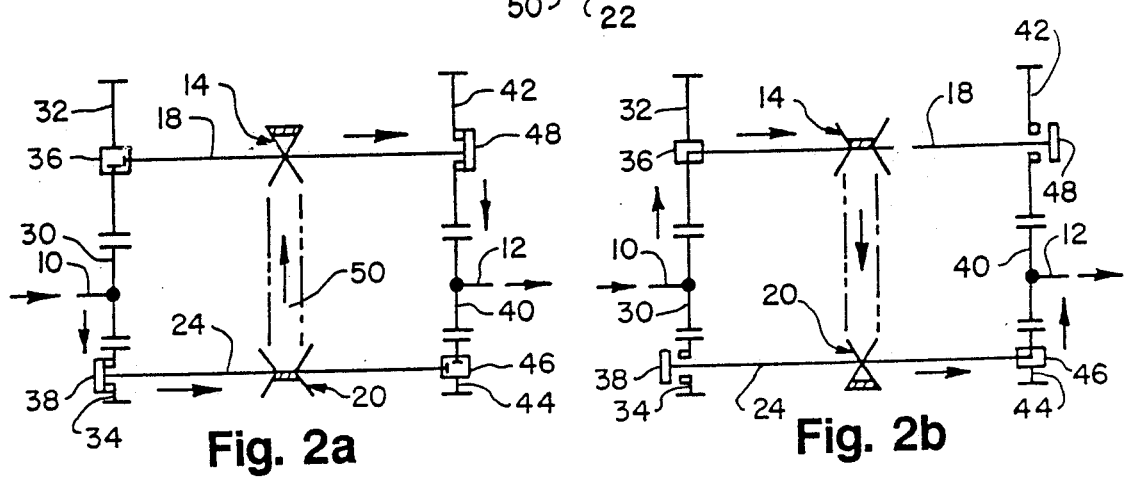
FIG. 2a is a schematic representation of the gearing system of the dual-pass CVT of FIG. 1 illustrating the power flow through the first pass.
FIG. 2b is a schematic representation of the gearing system of the dual-pass CVT of FIG. 1 illustrating the power flow through the second pass.

Turning to FIGS. 1, 2a and 2b, a dual-pass CVT having an input shaft 10 and an output shaft 12 can be seen. A first variable pulley 14 having a first movable sheave 16 is disposed on a first intermediate shaft 18. A second variable pulley 20 having a second movable sheave 22 is disposed on a second intermediate shaft 24. A first servo chamber 26 holds fluid to move the first movable sheave 16 and a second servo chamber 28 holds fluid to move the second movable sheave 22.

Attached to the input shaft 10 is a toothed gear 30. The teeth of the gear 30 intermesh with a reduction gear 32 and an overdrive gear 34. A first one-way clutch 36 is positioned between the reduction gear 32 and the first intermediate shaft 18 and is engaged when a first drive path is established during the first pass through the CVT. A first jaw clutch 38 is located between the overdrive gear 34 and the second intermediate shaft 24. It is disengaged when the first one-way clutch 36 is engaged, and engaged when the first one-way clutch 36 is disengaged. The engagement of the jaw clutches establishes selection of the drive path through the CVT.

Figure 9:
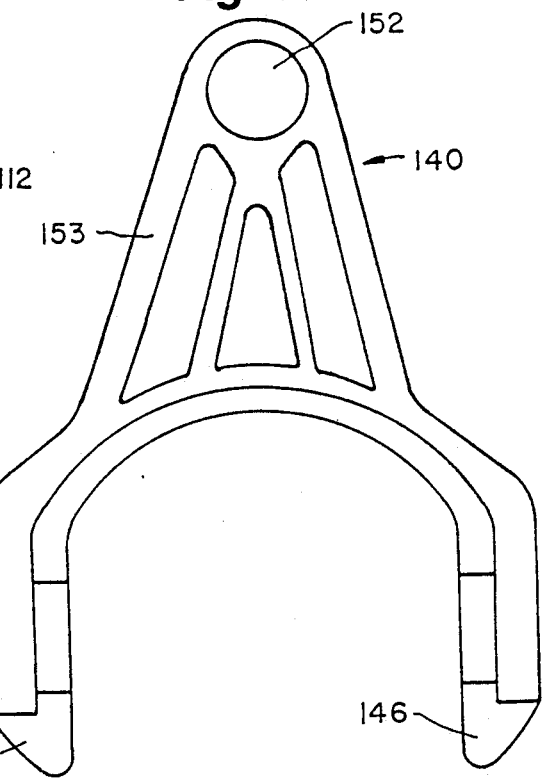
FIG. 9 is a front view of a fork utilized to engage and disengage the jaw clutches of the CVT.

Each jaw clutch 38, 48 is moved by a fork 140, 142 respectively. One such fork 140 is illustrated in FIG. 9. The fork 140 has a pair of arms 144, 146 that fit in a groove 148 in the movable half 150 of jaw clutch 38, seen best in FIG. 1. Movement back and forth of the fork causes engagement and disengagement of the jaw clutch 38. The fork 140 has an aperture 152 in its body 153 that allows it to be pressed onto a shaft 154 shown schematically in FIG. 10 so that the fork 140 moves with the shaft 154. The fork 142 similarly has arms and an aperture 160 in body 161, and is pressed onto a shaft 162. The arms fit into groove 164 in the movable half 166 of jaw clutch 48. Compressed air on line 168, seen in FIG. 10, forces both shafts 154, 162 in a direction that causes the forks to engage both the jaw clutches 38, 48. Compressed air supplied on line 170 is applied to the opposite ends of the shafts 154, 162 to move the forks in the opposite directions to disengage the clutches 38, 48.

A second toothed gear 40 is attached to the output shaft 12 and the teeth of the gear are intermeshed with a second reduction gear 42 and a second overdrive gear 44. The overdrive gear 44 is connected to the second intermediate shaft 24 through a second one-way clutch 46 that is engaged when the first one-way clutch is engaged to establish the first drive path and released when the second drive path is established. A second jaw clutch 48 is engaged when the second drive path is utilized so that the second reduction gear 42 rotates with the first intermediate shaft 18.

In the first pass, both one-way clutches 36 and 46 are engaged and both jaw clutches 38 and 48 are not engaged. The input shaft 10 drives the first intermediate shaft 18 which rotates the first variable pulley 14. A transmission belt 50 connects the first variable pulley 14 to the second variable pulley 20, and the first pulley thereby rotates the second intermediate shaft 24. The second overdrive gear 44 drives the output shaft 12. As jaw clutches 38 and 48 are not engaged, overdrive gear 34 and reduction gear 42 rotate independently of the second and first intermediate shafts, respectively, and the ratio between the first and second pulleys of the variable transmission component is free to be altered.

In the first drive path, the input shaft 10 drives the intermediate shaft 18 through the reduction gear 32. By gradually increasing the pressure of the fluid in the hydraulic circuit supplying the first servo chamber 26, the first movable sheave 16 of the first variable pulley is moved inward pushing the belt 50 outward on the first pulley and drawing it inward on the second pulley. The ratio across the CVT is increased from underdrive to overdrive. The pressure supplied to the second servo chamber 28 serves to provide the desired belt tension to prevent slippage of the belt and possible damage to the pulleys.

As the velocity of the second intermediate shaft increases with the change in ratio, eventually both the first overdrive gear 34 and the second intermediate shaft 24 will rotate at the same velocity, and both the second reduction gear 42 and the first intermediate shaft 18 will rotate at the same velocity. Sensors detecting the velocities of gears 34 and 42 and shafts 18 and 24 are able to trigger the engagement of the jaw clutches at this point through injecting compressed air on line 168 of FIG. 10. The jaw clutches 38 and 48 engage and the one-way clutches 36 and 46 are overrun. The drive path is altered to that for the second pass through the CVT.

In the second drive path, the input shaft 10 drives the second intermediate shaft 24 through overdrive gear 34. The second intermediate shaft 24 rotates the second variable pulley 20 and this pulley is now the driver pulley. On engagement of the second of the two jaw clutches, the hydraulic pressures supplying the first and second servo chambers are switched so that the primary pressure is supplied to the second servo chamber 28 and the secondary pressure is supplied to the first servo-chamber 26.

By supplying increasing pressure to the second servo chamber 28, the movable sheave 22 is forced inward urging the belt 50 outward on the second pulley and inward on the first pulley. As the CVT drives through the second pass, the ratio across the transmission increases for a second time. The output shaft 12 is driven by the first intermediate shaft 18 through the second reduction gear 42. The pressure supplied to the first servo chamber 26 serves to provide the correct belt tension to prevent slippage during the second-pass.

To return to the first pass, the two jaw clutches 38 and 48 are released and the one-way clutches 36 and 46 pick up the drive. The hydraulic lines supplying the first and second servo chamber must also be switched back so that the ratio changing pressure again supplies the first servo chamber attached to the first pulley and the belt tensioning pressure supplies the second servo chamber attached to the second pulley.

In FIG. 3 a schematic representation of a control system suitable for regulating the hydraulic pressures delivered to the driver and driven pulleys, respectively, is shown. The electro-hydraulic system includes a hydraulic pump 52 and first spool valve 54, second spool valve 56, third spool valve 58 and fourth spool valve 60. Three of the spool valves 56, 58 and 60 are pilot operated. The system utilizes sensors to monitor engine or input conditions and signal conditioners that are manipulated by a microprocessor system to provide electronic signals for the line pressure and for the primary and secondary pressure valves that operate the driver and driven pulleys, respectively.

The first spool valve 54 is not solenoid operated. Instead, it is spring biased by a spring 62. The pre-load determines the pilot supply pressure set point and is a fixed value. If the pilot supply pressure in the feedback stage 64 of the first spool valve 54, is greater than the set point value determined by the spring load, then the spool will move to the left allowing fluid to flow into the sump 66. This reduces the pilot supply pressure in the fluid on line 68. Conversely, if the pilot pressure on line 68 is less than the pilot supply pressure set point, the spring will bias the spool to the right allowing extra fluid to flow into the supply line 68 increasing the pressure.

The pilot supply pressure is used to regulate the line pressure at the second spool valve 56. Instead of returning a fixed set point, the line pressure pilot stage is preferably variable with input conditions. The pressure in the chamber 72 of the spool 56 is regulated by a solenoid valve 70 controlled by the minicomputer system. If the line pressure is less than the set point the pressure in chamber 72 will be raised by allowing more flow from line 68 and less flow into sump 74. Raising the pressure in chamber 72 will cause spool 56 to move left reducing the flow into sump 78 allowing the line pressure to increase. The line pressure is fed into the second chamber 76 of the spool valve. When the pressure achieved in the chamber 76, is greater than the setpoint, the line pressure is greater than desired, the valve 56 moves to the right, and fluid flows into a sump 78 reducing the line pressure. As the line pressure approaches the set point value, the minicomputer begins to lower the pressure in chamber 72 leading to an equilibrium condition. The area of the feedback chamber 76 is smaller than that of the pilot supply chamber 72 to allow the pilot supply pressure to be much lower than that of the line pressure.

The secondary hydraulic pressure is regulated in a similar manner. Solenoid valve 80 alters the pressure in chamber 82 by adjusting the flow from line 68 and the flow to sump 84 to maintain the secondary pressure equal to its set point, that is again a function of the engine conditions. A feedback chamber 86 receives the secondary pressure. The chamber 86 again has a reduced area so that the valve can be moved to the correct position to allow the desired amount of fluid flow without requiring excessive pressures in the pilot supply. When the secondary pressure is greater than that desired, the pressure in chamber 82 is decreased causing the spool to move to the right allowing excess fluid to drain into the sump 88. If the secondary pressure is less than the set point, the spool will move to the left and more fluid from the line will be allowed to flow into the valve until the pressure on line 90 is equal once more to the desired set point.

The primary servo pressure control spool valve 60 operates to regulate the flow in line 92, that is supplied to the servo chamber of the driver pulley thereby determining the ratio across the variable transmission. The primary control valve 60 is biased by springs 94 and 96 to a central position that allows a small change in the pressure applied in the right chamber 98 to effect a change in the primary flow fed to the line 92 to the driver pulley to determine the ratio across the variable transmission. There is no feedback control of the primary pressure and all controls of this value are therefore open loop with respect to pressure.

The solenoid valves in the preferred arrangement are energized by current signals, the magnitude and duration of which are determined by the solenoid driver and its associated control logic. This logic may include feed forward, and proportional plus integral plus derivative (PID) control actions as part of the overall control system strategy. These control actions are typically based on process variable deviation from set point. The set points are generated by the minicomputer, based on engine speed, torque demand and other parameters that may apply.

The minicomputer system is the brain of the electronic controls and its primary functions are to monitor the CVT, safely operate the transmission under normal and failure conditions, communicate with peripheral devices, and perform miscellaneous tasks. The overall control system strategy resides in memory and it will coordinate the operation of the CVT by generating proper set points and correcting signals to obtain desired belt ratio and belt tension for a given set of conditions. The primary hydraulic pressure will control the belt ratio while the secondary hydraulic pressure will control the belt tension. The control strategy may be geared toward achieving maximum fuel economy or maximum performance depending on the application. The system may also regulate a transition valve which is used to switch the primary and secondary hydraulic pressures to change the driver and driven pulleys to the dual-pass CVT from the first pass to the second.

Various sensors provide information on engine conditions that enable the primary ratio set point to be calculated in order to modify the pilot pressure to regulate the primary flow delivered to the drive pulley. The analog control and instrumentation block 100 indicated in FIG. 3 provides information to the control system. This system utilizes system monitoring 102, fail safe routines 104, peripheral interface systems 106, one or more overall system control strategies 108 and miscellaneous software 109 to regulate the control valves that modify the pilot pressure to provide the balance signals for second, third, and fourth spool valves 56, 58 and 60.

The dual-pass variable transmission system also includes means to ensure that the primary and secondary pressures are delivered to the servo chambers operating the driver and driven pulleys respectively. Unlike single pass CVTs, one of the variable pulleys is not the driver pulley throughout the whole operation of the dual-pass CVT transmission system. The system of this embodiment includes a mechanically operable valve 110 shown schematically in FIG. 3 that switches the supply of primary and secondary pressures to the first or second pulleys depending upon whether the transmission is operating in the first or second pass. A sensor is activated on change in position of the valve 110 and a signal indicating the change in pass feeds into the minicomputer on line 111.

Figure 4:
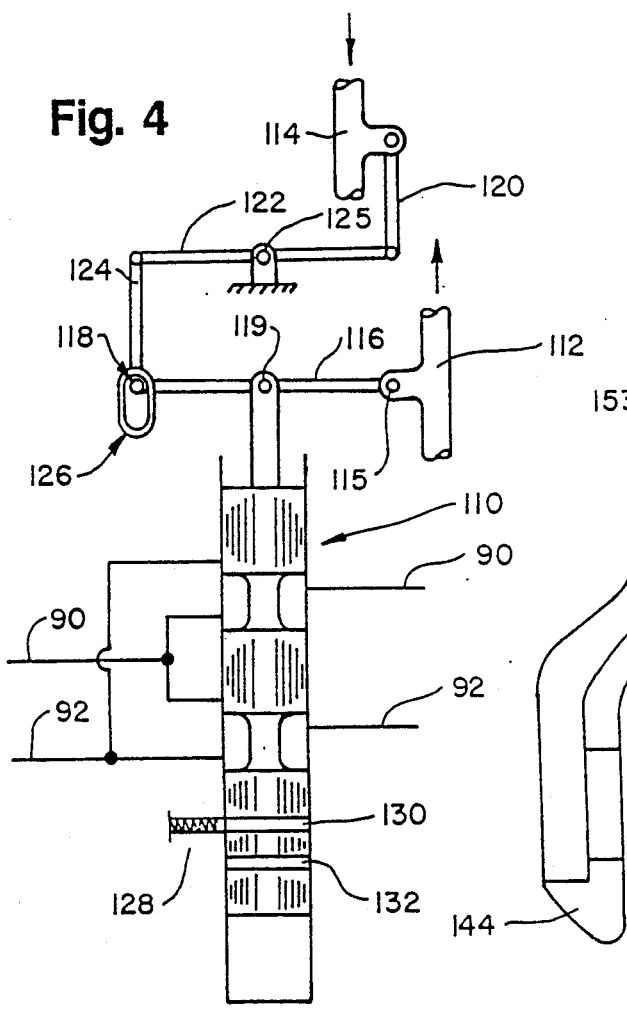
FIG. 4 is a schematic representation of a transition valve for providing the primary pressure to the desired variable pulley of the dual-pass CVT.

Turning to FIG. 4, a mechanical device for alternating the supply of primary and secondary pressures between the first and second pulleys can be seen. The apparatus comprises a transition valve 110 that is movable between a first position in which the primary pressure is supplied to the first pulley and secondary pressure is supplied to the second pulley and a second position in which the primary pressure is supplied to the second pulley and the secondary pressure is supplied to the first pulley.

A first link 112 is attached to the first clutch 38 and a second link 114 is attached to the second clutch 48. The first link 112 is in a first position when the first jaw clutch 38 is released and moves to a second position when the first jaw clutch is engaged. Likewise the second link 114 moves between first and second positions in response to release and engagement of the second jaw clutch 48. Pivotally attached to the first link 112 at a point 115 is a lever 116, having a pin 118 at one end. The transition valve 110 is pivotally attached to the lever 116 at its midpoint 119. The second link is connected through a series of pivoted connections 120, 122 and 124 to a ring 126 that is positioned around the pin 118. As the second jaw clutch 48 engages and releases, the ring 146 also moves between first and second positions as the connection 122 pivots about pin 125 and depending upon the position of the pin 118, this movement either does not move the pin and the lever to which it is attached, or, raises the pin thereby rotating the lever about the point 119 or the point 115.

Figure 5:
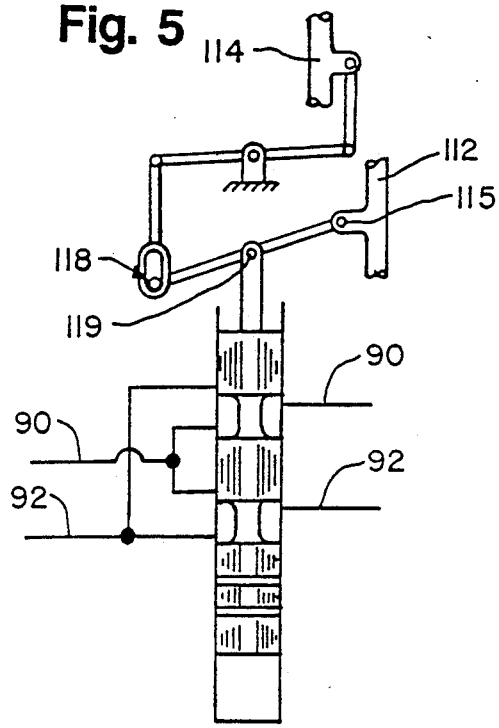
FIG. 5 is a schematic representation of the transition valve of FIG. 4 in which the first jaw clutch is engaged.
Figure 6:
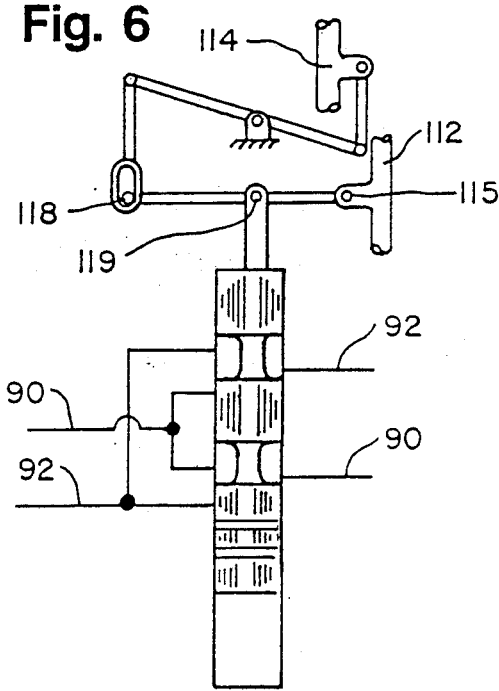
FIG. 6 is a schematic representation of the transition valve of FIG. 4 which has passed through the stage shown in FIG. 5 and in which the second jaw clutch is also engaged.

The schematic representation of FIG. 4 shows the valve in the first position when both jaw clutches are released and the transmission is operating in the first pass. From this position, either the first or the second jaw clutch may be the first to engage to change the transmission to the second pass. If the first clutch engages first, the pin moves downward to the position shown in FIG. 5 and the lever 116 pivots about the connection point to the valve. Then on engagement of the second jaw clutch, the ring moves to the position shown in FIG. 6 raising the pin to its new position. This rotates the lever about point 115, thus raising the transition valve 110. A spring loaded ball bearing 128, lodged in a first groove 130 on the valve to secure the valve in the first position, is dislodged and moved in to a second groove 132 to hold the valve at its new location.

Figure 7:
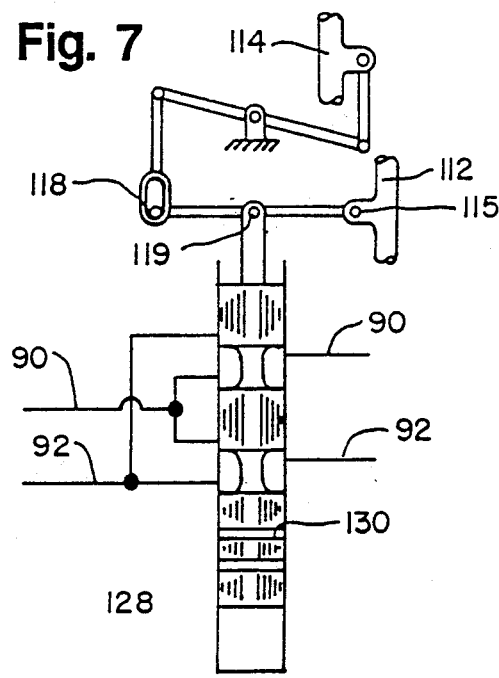
FIG. 7 is a schematic representation of the transition valve of FIG. 4 in which the second jaw clutch is engaged.
Figure 8:
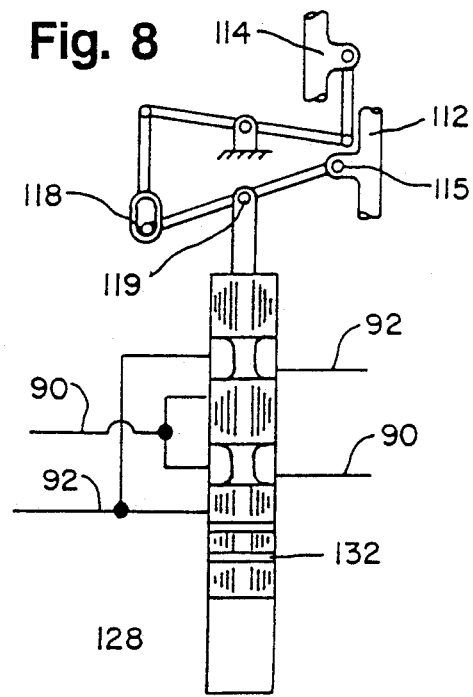
FIG. 8 is a schematic representation of the transition valve of FIG. 4 which has passed through the stage shown in FIG. 7 and in which the first jaw clutch is also engaged.

If, alternatively, the second jaw clutch is the first to engage, then the ring is first moved to the position shown in FIG. 7. The pin 118 remains stationary because of its location and no force is therefore exerted on the lever 116. On engagement of the second jaw clutch, the pin 118 is prevented from downward movement due to the location of the ring. As the link 112 is moved upward, link 116 rotates about the pin 118. It is prevented from rotating about the point 119 due to the position of the ring 126. The transition valve is therefore moved upward again to the second position on engagement of the last of the two clutches to engage, with no movement occurring in response to engagement of the first of the clutches to engage. A similar series of event occurs on release of the jaw clutches so that the valve always moves on release of the second of the two clutches.

The change in position of the valve can also be used to activate a sensor to actuate a different control strategy for operation during the second pass of the dual-pass CVT. This allows different speed, acceleration and/or different criteria to be applied to regulate the hydraulic pressures in the different passes, if desired.

By allowing one valve to continually regulate the primary hydraulic pressure and another to regulate the secondary line pressure, the change in pressure on either of the lines on a change in drive path is kept relatively small in comparison with the pressure changes necessary to change from a secondary pressure to a primary pressure or vice versa. By using a transition mechanism such as that illustrated in FIG. 4, the switch of paths occurs on engagement of the last jaw clutch, thus preventing a premature change in ratio that might create a discrepancy between the speeds of rotation of the two halves of the unengaged clutch or clutches.

Figure 10:
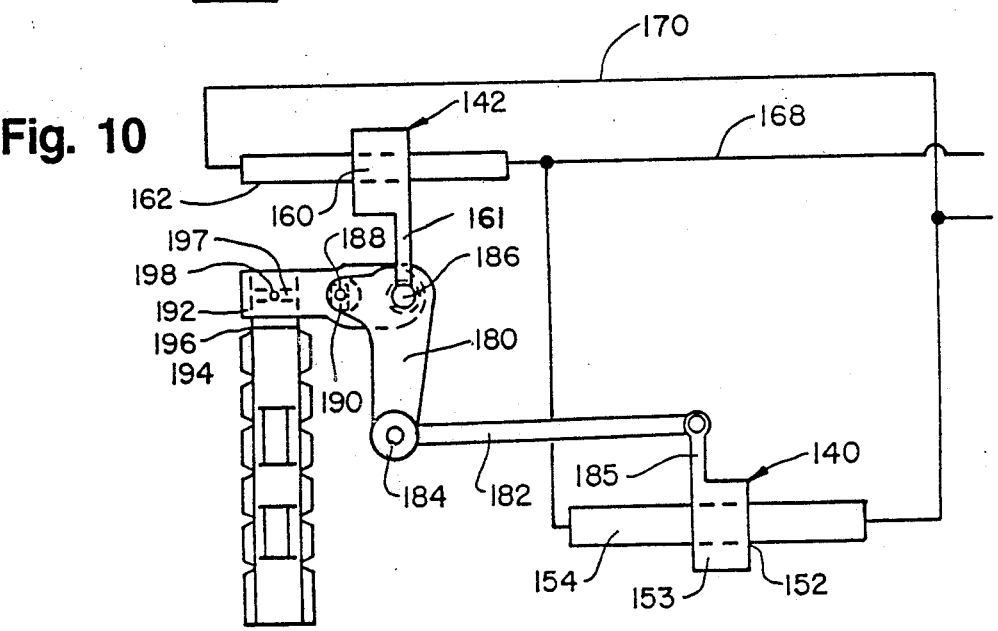
FIG. 10 is a schematic representation of an alternative embodiment of the invention.

A second embodiment of a linkage mechanism for moving a transition valve is shown in FIG. 10. In order for the transition mechanism to fit conveniently into the body of the transmission, a particular arrangement of links is preferable. In order to facilitate this, a system schematically identical to that described above is utilized. A dog linkage 180 is pivotally attached at a first end to a first lever 182 at a first pivot 184. The lever 182 is pivotally connected to the fork 140 by first fixed line 185. As the fork 140 engages jaw clutch 38, the first lever 182 moves to the right as illustrated. The dog leg linkage 180 rotates about a second pivot 186. A first pin 188 attached to the second end of the dog leg linkage 180 moves downward.

The first pin 188 protrudes into a first slot 190 in a second lever 192 The second lever 192 is pivotally attached at a first end to the dog leg linkage 180 at the second pivot 186. The second pivot 186 is also connected to the fork 142 so that as the fork 142 moves leftward as illustrated, the second lever 192 also moves to the left. The second lever 192 is attached at a second end to a valve 194. The valve 194 has a flat portion 196 on which the second lever 192 rests The valve 194 also has a second slot 197 that receives a second pin 198 attached to the second lever 192. This second slot 197 accommodates the leftward movement of the second lever 192. The second slot 197 allows arcuate movement of the second level 192 on engagement of the jaw clutch 48. Any vertical movement of the second pin 198, however, causes vertical movement of the valve 194 and changes the hydraulic pressures received by the variable pulleys.

The linkage functions in the same manner as described previously with respect to FIGS. 4-8, with the valve being forced downward on engagement of the last of the two clutches to engage.

Other transition mechanisms may, however, be used to implement this invention. For example, one alternative utilizes an electronic signal developed as a result of sensing the engagement of both of the jaw clutches to trigger movement of a valve. Likewise, clutches other than jaw clutches may be utilized to change the drive path. Sensors can also be provided to indicate when engagement of these clutches has occurred and provide a signal to trigger movement of a valve. As mentioned above, however, delay between signalling engagement and its achievement is likely to be large with other types of clutches making this a less attractive option.

While preferred embodiments of this invention are illustrated, it will be understood, of course that the invention is not limited to these embodiments. Those skilled in the art to which the invention pertains may make modifications and other embodiments employing the principles of the invention, particularly upon considering the foregoing teachings.

What is claimed is:

1. A control system for controlling the hydraulic pressure in a dual-pass continuously variable transmission system having a plurality of drive paths from a power input to a power output, and a continuously variable component including first and second variable pulleys disposed respectively on first and second intermediate shafts, said transmission system having first and second clutches engagable to effect transition from a first drive path in which the first variable pulley is the driver pulley to a second drive path in which the second variable pulley is the driver pulley, said transmission system being releasable to effect a transition from said second drive path to said first drive path, the control system comprising:
    means to provide a primary hydraulic pressure to each of said first and second variable pulleys;
    means for providing a secondary hydraulic pressure to each of said first and second variable pulleys;
    means for electronically regulating said primary and secondary pressures responsive to engine conditions; and
    means for directing said primary and secondary hydraulic pressures to said first and second variable pulleys in response to change of drive path.

2. The control system of claim 1 wherein said means to provide primary and secondary hydraulic pressure comprises:
    means for providing a hydraulic line pressure;
    a valve for adjusting said hydraulic line pressure to provide a predetermined pilot supply pressure;
    means for adjusting a first intermediate pressure derived from said pilot supply pressure to regulate said primary hydraulic pressure; and
    means for adjusting a second intermediate pressure derived from said pilot pressure to regulate said secondary pressure.

3. The control system of claim 2 further comprising means for adjusting a third intermediate pressure derived from said pilot pressure to regulate the hydraulic line pressure.

4. The control system of claim 3 wherein said means for adjusting said pilot pressure is a spool valve having a first chamber and a second chamber and a spool member disposed therebetween said first chamber receiving adjusted pilot pressure, said second chamber receiving said hydraulic line pressure, said spool member being movable in response to a discrepancy between the pressures in said first and second chambers to allow said hydraulic line pressure to adjust and balance the adjusted pilot pressure.

5. The control system of claim 4 wherein said means for adjusting said pilot pressure is a microprocessor system that provides in line pressure set point.

6. The control system of claim 2 wherein said means for adjusting said pilot pressure to regulate said primary hydraulic pressure is a first solenoid operated valve responsive to a first set point signal developed in response to engine conditions.

7. The control system of claim 2 wherein said means for adjusting said pilot pressure to regulate said secondary hydraulic pressure is a second solenoid operated valve responsive to a second set point signal developed in response to engine conditions.

8. The control system of claim 1 wherein said means for electronically regulating said primary and secondary pressures is a microprocessor system.

9. The control system of claim 8 wherein said microprocessor system includes first and second control strategies operable to provide first and second set point signals to first and second said solenoid operated valves, said first control strategy being operable in said first drive path and said second control strategy being operable in said second drive path.

10. The control system of claim 9 including a sensor responsive to said directing means to allow switching between said first and second control strategies in response to a change in drive path.

11. The control system of claim 10 wherein said directing means is activated upon the last of said first and second clutches to engage.

12. The control system of claim 9 wherein said directing means is a transition mechanism comprising:
a linking means responsive to engagement of said first and second clutches and pivotable about first, second and third points, said linking means being movable between first and second fixed positions about said first point in response to engagement and release of said first clutch;
a valve pivotally attached to said link at said third point and movable between first and second positions, in response to displacement of said third point on rotation of said link about one of said first and second points; and
means to rotate said link about one of said first and second points in response to the last of said first and second clutches to engage.

13. A control system for controlling the hydraulic pressure in a dual-pass continuously variable transmission system having a plurality of drive paths from a power input to a power output, and a continuously variable component including first and second hydraulically actuated variable pulleys disposed respectively on first and second intermediate shafts, said transmission system having first and second clutches engagable to effect transition from a first drive path in which said first pulley is a driver pulley to a second drive path in which said second pulley is the driver pulley, and said transmission system being releasable to effect transition from said second drive path to said first drive path, the control system comprising:
means for providing a hydraulic line pressure;
means for providing a primary hydraulic pressure to each of said first and second variable pulleys;
means for providing a secondary hydraulic pressure to each of said first and second variable pulleys;
a valve for adjusting said hydraulic line pressure to provide a predetermined pilot pressure, said predetermined pilot pressure being fixed;
first means for electronically adjusting a first intermediate pressure derived from said pilot pressure to regulate said secondary hydraulic pressure; and
a transition mechanism for switching said primary and secondary hydraulic pressures between said first and second variable pulleys in response to a change in drive path.

14. The control system of claim 13 wherein said first and second means comprise a first solenoid valve responsive to a first signal and second solenoid operated valves responsive to a second signal, said first and second signals being developed by a microprocessor in response to engine conditions.

15. The control system of claim 14 wherein said microprocessor system includes first and second control strategies operable to provide set point signals to said first and second solenoid operated valves, said first control strategy being operable in said first drive path and said second control strategy being operable in said second drive path.

16. The control system of claim 13 wherein said means for switching said primary and secondary pressures is triggered upon the last of the first and second clutches to engage.

17. The control system of claim 14 including a third means for electronically adjusting a third intermediate pressure derived from said pilot pressure to regulate said line pressure in response to engine conditions.

18. The control system of claim 15 further comprising a sensor responsive to the condition of said transition mechanism for changing operating schedules in response to a change in drive path.

19. In a control system for controlling the hydraulic pressure in a dual-pass continuously variable transmission system having a plurality of drive paths from a power input to a power output, and a continuously variable component including first and second hydraulically actuated variable pulleys disposed respectively on first and second intermediate shafts, and having first and second clutches engagable to effect transition from a first drive path in which said first pulley is a driver pulley to a second drive path in which said second pulley is the driver pulley, and said transmission system being releasable to effect transition from said second drive path to said first drive path a transition mechanism comprising:
a lever member connected to said first clutch and pivotally movable about a plurality of points, including a first, a second and a third point, said first point of said lever member being movable between first and second fixed positions in response to engagement and release of said first clutch, said second point being movable between first and second related positions;
abutment means restricting movement of said second point between said first and second related positions;
a valve pivotally attached to said lever member at said third point and movable between first and second positions in response to displacement of said third point;
said abutment means being operatively connected to said second clutch and movable between a first abutment position and a second abutment position in response to engagement of said second clutch, displacement of said abutment means altering the possible positions of said second point.

20. The transmission mechanism of claim 19 further comprising a protrusion extending from said second point in a direction substantially transverse to the direction of displacement of said second point, said abutment means being a ring member surrounding said protrusion.

21. The transmission mechanism of claim 19 further comprising a first link member attached to said ring and a second link member pivotally attached to a second link, said second link being operatively connected to said second clutch.

* * * * *

UNITED STATES PATENT AND TRADEMARK OFFICE
CERTIFICATE OF CORRECTION

PATENT NO. : 5,031,481

DATED : July 16, 1991

INVENTOR(S) : Marcelo C. Algrain et al.

It is certified that error appears in the above-identified patent and that said Letters Patent is hereby corrected as shown below:

In column 1, line 36, after "thus" please insert --,--.

In column 1, line 45, please delete "ration" and substitute therefor --ratio--.

In column 1, line 50, please delete "pulley" and substitute therefor --pulleys--.

In column 10, line 53, please delete "event" and substitute therefor --events--.

In column 11, line 21, after the first occurrence of "192" please insert --.--.

In column 11, line 28, after "rests" please insert --.--.

UNITED STATES PATENT AND TRADEMARK OFFICE
CERTIFICATE OF CORRECTION

PATENT NO. : 5,031,481

DATED : July 16, 1991

INVENTOR(S) : Marcelo C. Algrain et al.

It is certified that error appears in the above-identified patent and that said Letters Patent is hereby corrected as shown below:

Column 12,
    in claim 4, line 37, after "therebetween" insert
--,--.

Signed and Sealed this

Fourteenth Day of September, 1993

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,031,481
DATED : July 16, 1991
INVENTOR(S) : Marcelo C. Algrain et al.

It is certified that error appears in the above-indentified patent and that said Letters Patent is hereby corrected as shown below:

IN THE DRAWINGS, sheet 1, FIG. 2a and FIG 2b should be switched so that present 2a should be 2b and present 2b should be 2a.

In column 13, line 46 after "pressure" please insert --second means for electronically adjusting said pilot pressure to regulate said secondary hydraulic pressure;--

Signed and Sealed this

Twenty-first Day of February, 1995

Attest:

BRUCE LEHMAN

Attesting Officer

Commissioner of Patents and Trademarks